United States Patent [19]

Dola et al.

[11] E Patent Number: Re. 32,691

[45] Reissued Date of Patent: Jun. 7, 1988

[54] HIGH SPEED MODULAR CONNECTOR FOR PRINTED CIRCUIT BOARDS

[75] Inventors: Frank P. Dola; John H. Lauterbach, both of Hudson, Fla.

[73] Assignee: AMP Incorporated, Harrisburg, Pa.

[21] Appl. No.: 868,215

[22] Filed: May 28, 1986

Related U.S. Patent Documents

Reissue of:

[64] Patent No.: 4,451,107
Issued: May 29, 1984
Appl. No.: 410,197
Filed: Aug. 23, 1982

[51] Int. Cl.[4] ..... H01R 4/66; H01R 13/648

[52] U.S. Cl. ..... 439/608; 29/858; 439/65

[58] Field of Search ..... 339/218, 17 C, 17 L, 339/17 LC, 136 M, 143 R, 176 M, 14 R, 147 R, 177 R; 174/153; 29/841, 848, 856, 858, 883, 61, 65; 269/267, 269; 439/604, 606, 608, 736

[56] References Cited

U.S. PATENT DOCUMENTS

| | | | |
|---|---|---|---|
| 2,418,729 | 4/1947 | Schemers | 174/153 R |
| 2,438,572 | 3/1948 | McCormack | 174/153 R |
| 2,759,487 | 7/1956 | Carr et al. | 339/177 R X |
| 3,384,864 | 5/1968 | Schwartz | 339/17 LC X |
| 4,401,355 | 8/1983 | Young | 339/17 LC X |

FOREIGN PATENT DOCUMENTS 52-74883 6/1977 Japan .

OTHER PUBLICATIONS

The Condensed Chemical Dictionary, Reinhold Publishing Corp, 1956, p. 1163.

Organic Chemistry, Fieser & Fieser, 3rd Ed. 1956, pp. 847,848,849,851.

U.S. patent application Ser. No. 866,518, filed May 23, 1986.

IBM Bulletin, Arvanitakis, vol. 21, No. 3, p. 955, 8/78.

Partial translation-Japanese Patent No. 46-17736, 5/1971.

*Primary Examiner*—Eugene F. Desmond

*Attorney, Agent, or Firm*—Robert W. Pitts

[57] ABSTRACT

Modular connector comprises a die cast zinc housing with die cast zinc terminals surrounded by nylon sleeves passing therethrough. Terminals may have right angles therein for connecting circuit boards at right angles such as daughter boards being connected to mother boards. Connectors are modular in form so that individual connectors may be assembled to a circuit board one at a time to form an assembly having varying impedance characteristics throughout its length. Modules providing solely for grounding or power transmission between boards may be provided.

11 Claims, 4 Drawing Sheets

HIGH SPEED MODULAR CONNECTOR FOR PRINTED CIRCUIT BOARDS

Matter enclosed in heavy brackets [ ] appears in the original patent but forms no part of this reissue specification; matter printed in italics indicates the additions made by reissue.

BACKGROUND OF THE INVENTION

The present invention relates to an electrical connector for printed circuit boards, and particularly to a high-speed modular connector for connecting a daughter board to a mother board.

Current electronic assembly techniques, particularly in the field of computers, utilize banks of removable printed circuit boards commonly known as daughter boards which are removably connected to associated circuitry commonly known as mother boards. Such banks of removable circuit boards require connectors with multiple rows of terminals therein, generally on 0.100 inch centers, which serve to connect traces on the daughter boards with traces on the mother boards. Typically, the traces end at rows of plated-through holes in the boards, and the boards each have a connector mounted thereon with rows of pins therein soldered to the plated-through holes. The connectors are removably matable for ready replacement of a daughter board. See, for example, U.S. Pat. No. 3,864,000. The connectors employ stamped and formed terminals which are fit into plastic housings, or the housings are injection molded onto the terminals.

In modern electronic circuits, the use of increasingly higher speed switching signals has necessitated shunting unwanted signal frequencies to ground throughout the circuitry. At the connector interfaces between mother boards and daughter boards this has been accomplished primarily by alternating ground terminals with signal terminals in the connectors in order to attenuate unwanted frequencies. This limits the number of terminals which may be used for signal transmission in a connector and thus limits the signal traces which may be interconnected. It would be most desirable to have a connector where ground means is provided in the housing so that all the terminals therein could be used for signal transmission, thus providing a high density connector.

SUMMARY OF THE INVENTION

Accordingly, it is an object of the present invention to provide an electrical connector system for removable connection of daughter boards to mother boards which attenuates unwanted EMI without requiring ground terminals throughout the connector.

It is another object of the present invention to provide a high speed right angle connector without using grounding terminals.

It is another object of the present invention to provide a modular connector which may be mounted on a daughter board with other modular connectors to provide the desired impedance characteristics throughout the length of the connector assembly.

The present invention accomplishes the object of grounding unwanted EMI by the provision of a die cast zinc housing with passages therethrough and terminals insulated therefrom by a dielectric sleeve. This is accomplished by injection molding plastic sleeves through the passages and subsequently die casting zinc terminals through the plastic sleeves. The method of manufacture also makes possible a high speed connector having right angle terminals passing through a solid housing. The connector is modular in form, consisting of two rows of two terminals each, which is assembled to a daughter board adjacent a similar connector to form a connector assembly of any desired length having two rows of terminals. The dielectric sleeve in each may be formed of any desired dielectric to achieve the desired impedance in any module. Where shielding is not necessary, more conventional modules having metal terminals in plastic housings may be used. Modules with or without shielding solely for the purpose of power transmission may also be provided. The modular nature of the connector also allows for thermal expansion differentials between the assembly and the associated circuit board.

DETAILED DESCRIPTION OF THE PREFERRED EMBODIMENT

Figure 1:
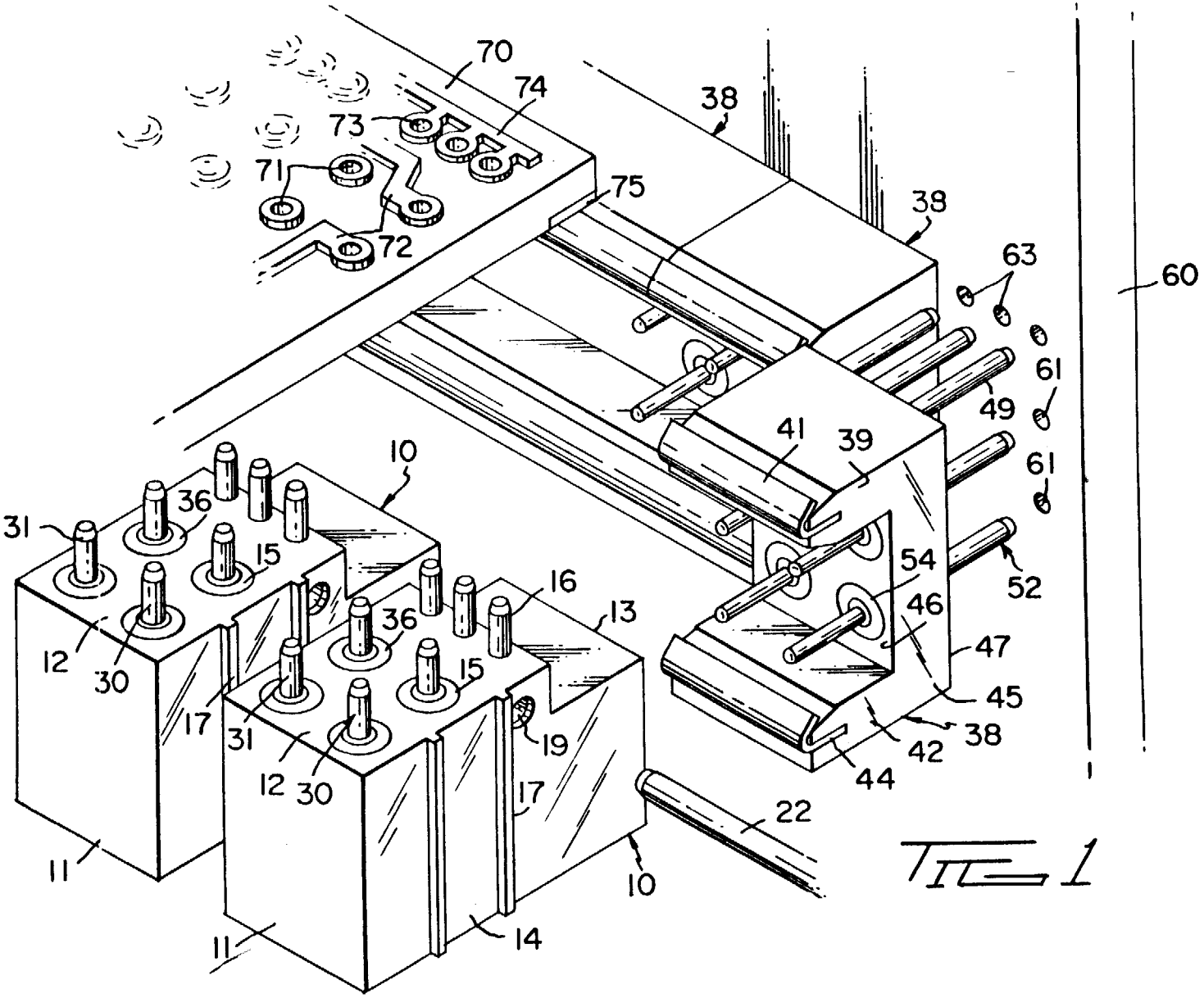
FIG. 1 is a perspective of the modular connectors exploded from the daughter board and mother board.

FIG. 1 is a perspective view of a high speed modular connector 10 used to electrically connect a mother board 60 to a daughter board 70. The connector 10 is shown exploded from the boards 60, 70 and an adjacent connector 10. Each connector 10 comprises a metal housing 11 having a first planar face 12 and a second planar face 13 which is perpendicular to face 12. Terminals 30 pass between faces 12, 13 through passages 15 in the housing. A nylon sleeve 36 is continuous through each passage 15 between faces 12, 13, each sleeve 36 surrounding a terminal 30 to electrically insulate it from the housing 11. Each terminal 30 has a pin 31 extending above face 12; the pins 31 are received in through holes 71 in the daughter board 70 where they make contact with signal traces 72. Ground pins 16 integral with housing 11 are received in through holes 73 which are connected with a ground trace 74. Each connector 10 has ribs 17 in sidewall 14 which are matable with grooves 18 in the opposite sidewall of an adjacent connector 10. The ribs 17 run perpendicular to daughter board 70 so that the connectors 10 may be assembled to a daughter board 70 one at a time. When all connectors 10 are assembled thereto, aligning pin 22 is pushed through aligning holes 19 to align all adjacent modular connectors 10 on the daughter board 70.

Referring still to FIG. 1, auxiliary connectors 38 are mouned on mother board 60 and are profiled to receive the connectors 10. Each auxiliary connector 38 comprises a metal housing 45 which has a forward endwall 39 and a rearward endwall 42 with a planar mating face 46 extending therebetween. The endwalls 39, 42 are spaced to accommodate connector 10 therebetween so that second face 13 will abut mating face 46. The terminals 30 in connector 10 are provided with sockets 33 (FIG. 3) at second face 13 which receive the terminals 52 mounted in the auxiliary connector 38. The connector 38 comprises a metal housing 45 having apertures 48 through mating face 46 which contains nylon sleeves 54 surrounding terminals 52 to electrically insulate them from housing 45. The terminals 52 fit into through holes 61 in the mother board 60 while metal ground pins 49 integral with housing 45 fit into through holes 63. Ground clips 41, 44 fit into endwalls 39, 42 respectively and serve to ground the daughter board 70 (via ground strip 75) and the housing 11 respectively.

Figure 2:
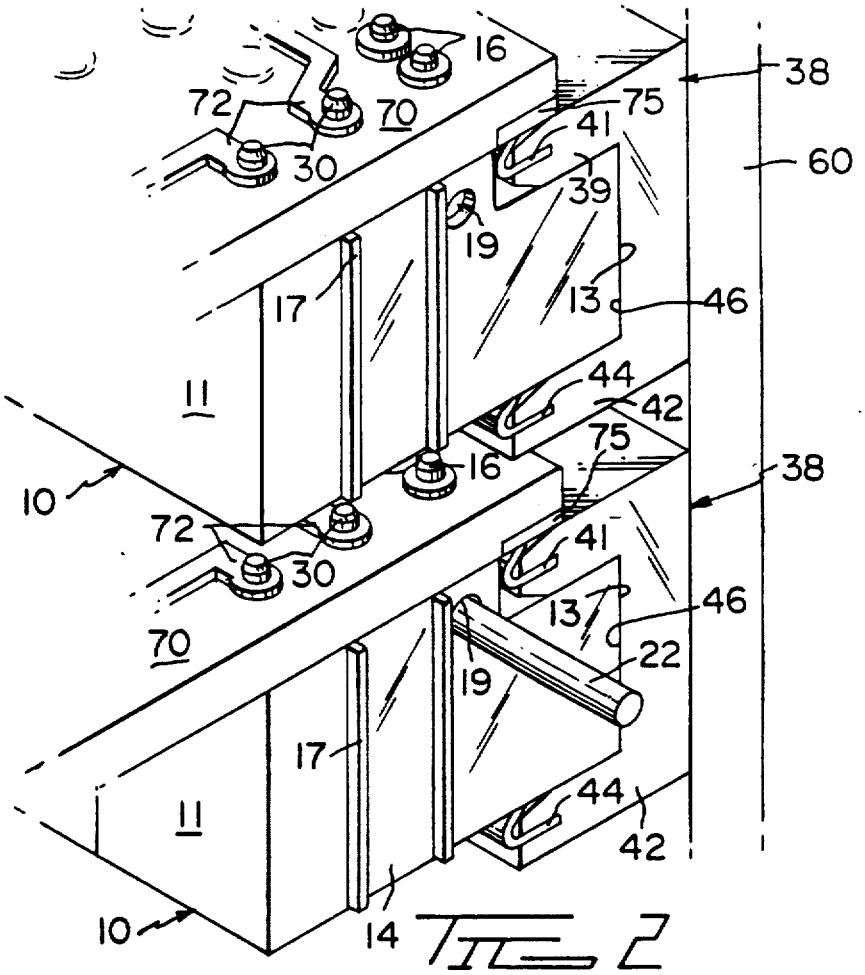
FIG. 2 is a perspective of the connectors as assembled to the boards and mated.

FIG. 2 shows the connector 10 as mounted to a daughter board 70 and plugged into an auxiliary connector 38 mounted to a mother board 60. The pins 16, 31 are soldered to the daughter board 70 while the aligning pin 22 is in place; the pin 22 may subsequently be removed, as alignment between adjacent connectors 10 is then assured. Terminals 52 (FIG. 1) in auxiliary connector 38 are soldered to the plated-through holes 61 (FIG. 1) to fix the auxiliary connector 38 to the mother board. Daughter boards 70 connector to the mother board 60 as shown in FIG. 2 may be readily replaced by simply unplugging the modular connectors 10 from the auxiliary connectors 38.

Figure 3:
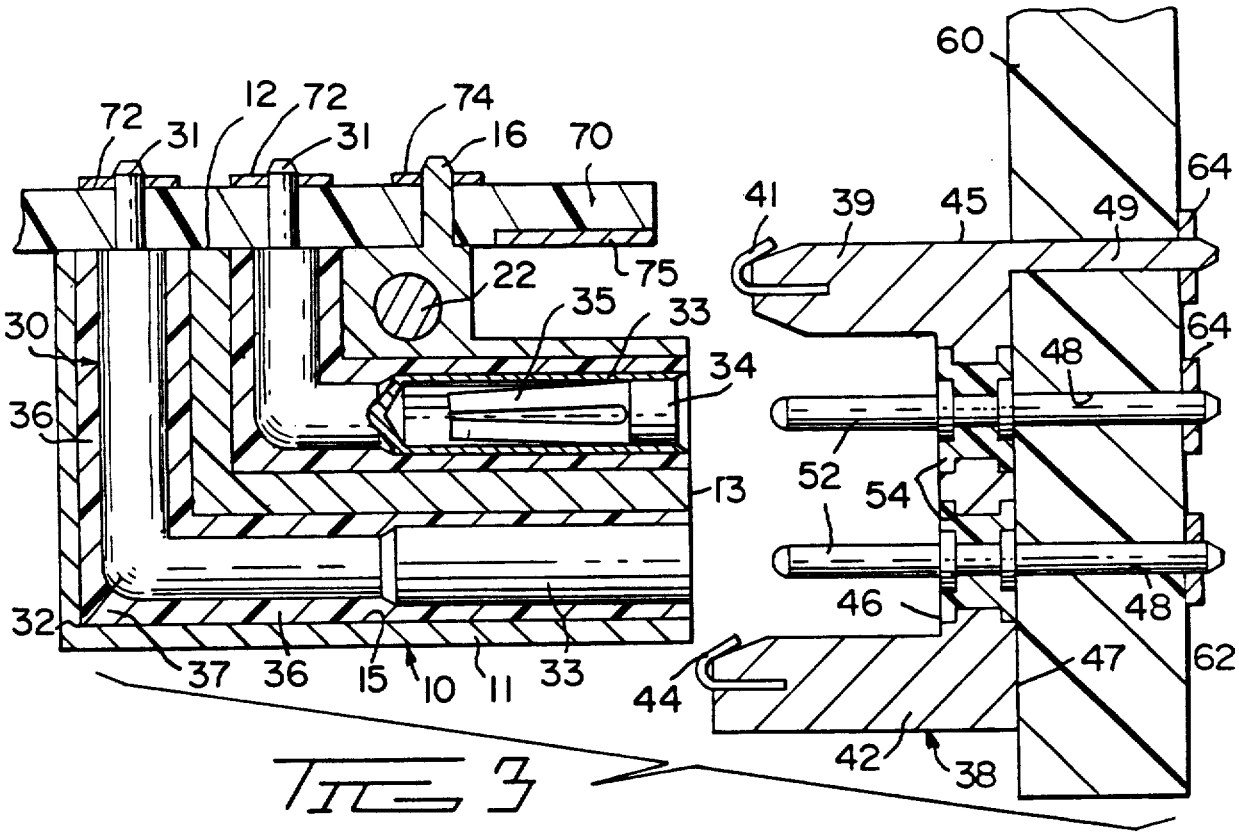
FIG. 3 is a cross section of the connectors as assembled to the circuit boards prior to mating.

FIG. 3 is a cross section of the connector 10 as mounted to a daughter board 70 by soldering pins 31, 16 to traces 72, 74 respectively. Note that aligning pin 22 (FIGS. 1 and 2) has been removed from aligning holes 19 in adjacent connectors. Each terminal 30 has a pin 31 extending from first face 21 and a socket 33 extending into second face 13. Each socket 33 has an insert 34 placed thereon which has four resilient fingers 35 thereon which serve to grip terminals 52. The inserts 35 are of the type disclosed in U.S. Pat. No. 4,296,993. The terminals 52 are received in the inserts 34 as second face 13 is received against connector mating face 46 on the auxiliary connector 38. The terminals 30 each have a right angle bend 32 between first face 12 and second face 13, and each terminal 30 is insulated from the housing 11 by a nylon sleeve 36 which fills the passage 15 between the terminal 30 and the housing 11. The auxiliary connector 38 has terminals 52 passing therethrough which are likewise insulated from the metal housing 45 by nylon sleeves 54 which fill the passages 48 between the terminals 52 and the housing 45. The terminals 52 and ground pins 49 are soldered to traces 62, 64 respectively on the mother board 60.

Figure 4:
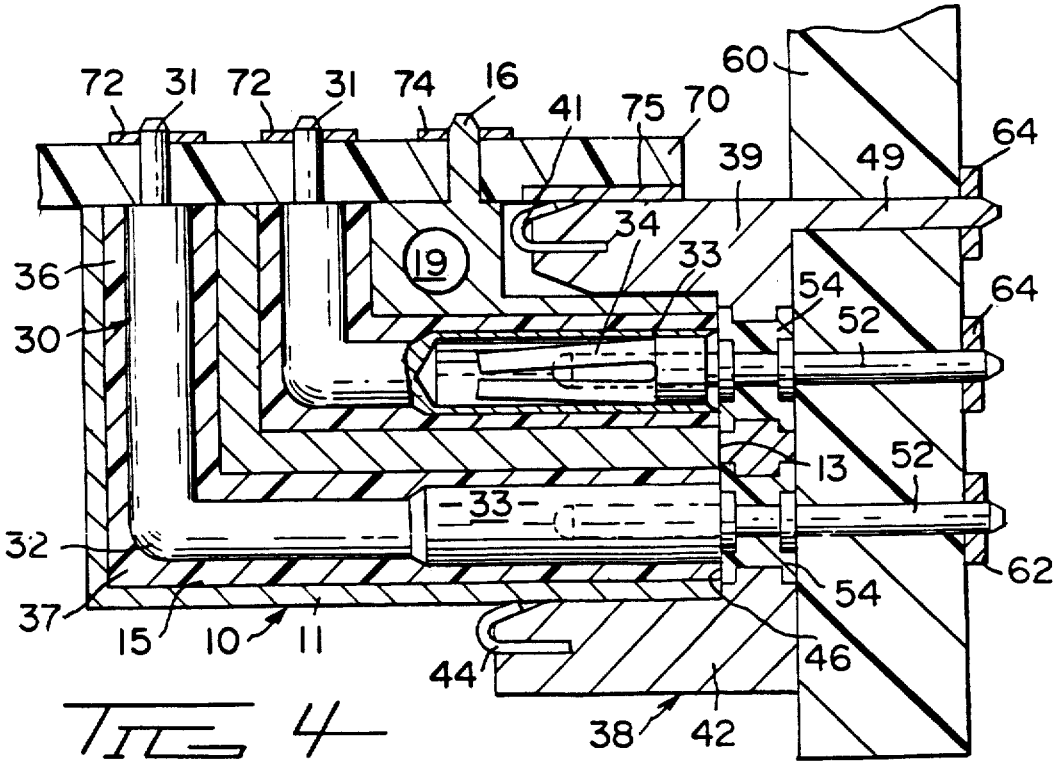
FIG. 4 is a cross section of the connectors as assembled to circuit boards after mating.

FIG. 4 illustrates the daughter board 70 connected to the mother board 60, the connector 10 being pluggably received by auxiliary connector 38. The grounding clip 41 in forward endwall 39 contacts the ground trace 74 to ground the daughter board 70 to ground trace 64 on the mother board 60. Additional grounding of the connector 10 to the mother board 60 is provided by grounding clip 44 on the rear endwall 42. Note that the construction of the mother board 60 and daughter board 70 is shown in simplified form in these illustrations; for proper suppression of noise between signal traces 62, 72, a multi-layer board having ground planes and signal traces therein would be used. Such low-noise multilayer boards are well known in the art.

The above described embodiments of connector 10 and auxiliary connector 38 are directed to a high-speed connector, so called because the metal housings 11, 45 attenuate interference of high speed signal transmission through terminals 30, 52. Thus all terminals may be used for signal transmission without the need for using intermittent terminals for ground purposes to suppress noise. The connector described thus serves as a high density connector.

Figure 5:
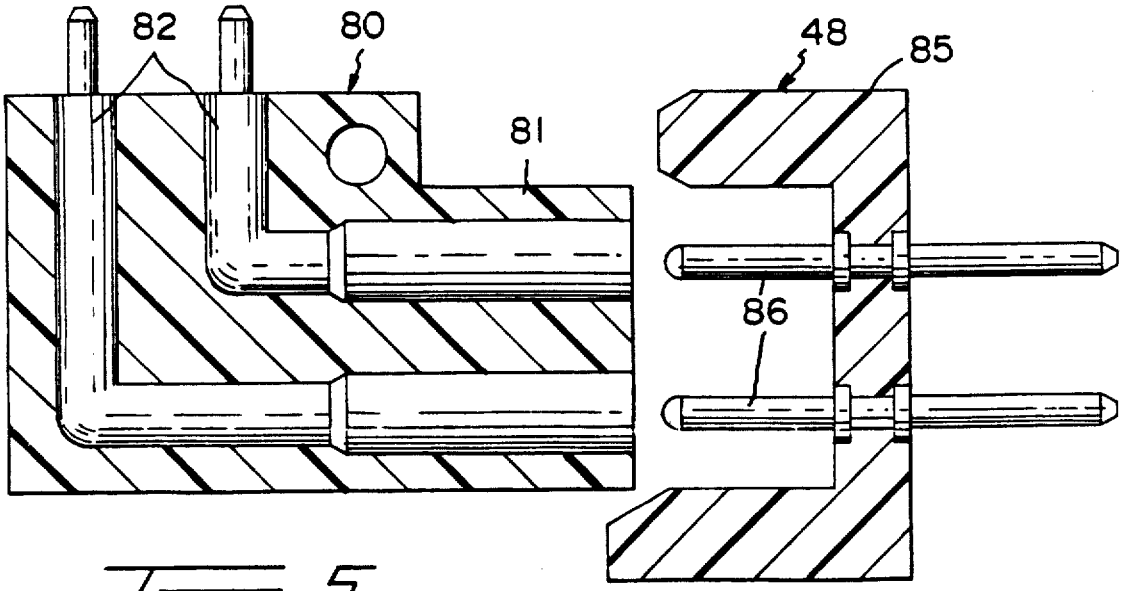
FIG. 5 is a cross section of an unshielded connector in modular form.

In some instances, it may be desired to mate a daughter board to a mother board where not all signal transmissions therebetween are high speed, and noise suppression thus is not necessary. The modular nature of the connector permits the above-described high speed connectors 10, 38 to be assembled with low speed connectors 80, 84 illustrated in FIG. 5. Connector 80 utilizes a conventional plastic housing 81 with metal terminals 82 therethrough, while auxiliary connector 84 utilizes a plastic housing 85 with metal terminals 86 therethrough. As the signal transmission through these connectors is not high speed, grounding is not necessary.

Figure 6:
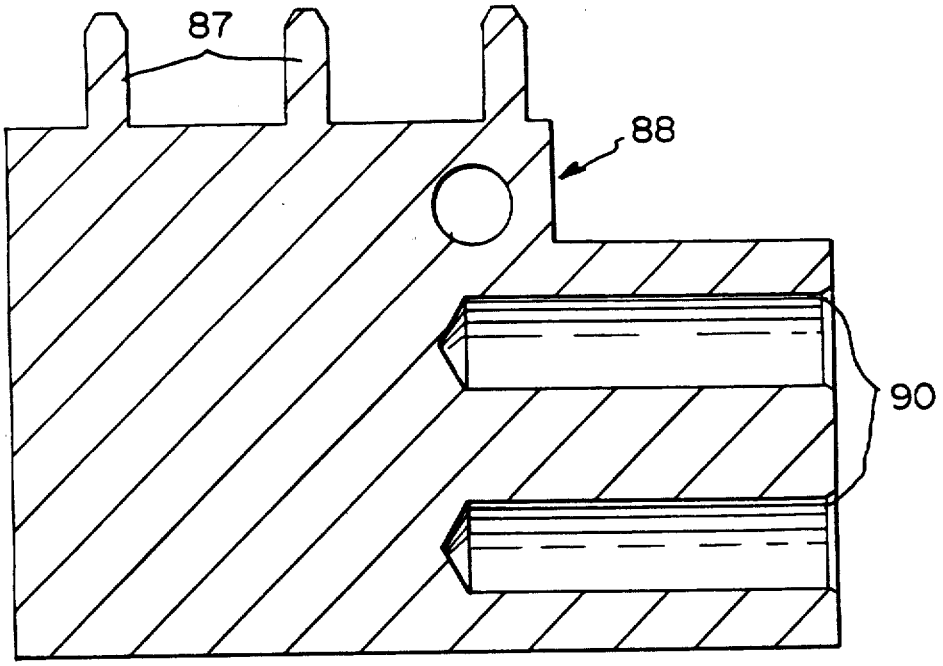
FIG. 6 is a cross section of a modular ground connector.
Figure 7:
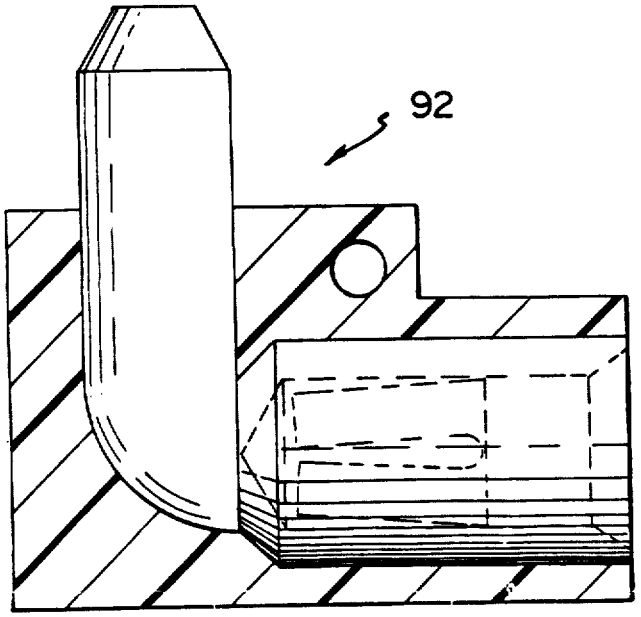
FIG. 7 is a cross section of a modular power connector.

FIG. 6 illustrates a grounding module 88 which is one piece cast zinc with pins 87 for insertion in through holes in a daughter board and sockets 90 which receive inserts 34 (FIGS. 3 and 4) for mating to an auxiliary connector on a mother board. In prior art connectors, it has been necessary to use several terminals of a mother board/daughter board connector for power transmission due to limited current carrying ability of a single terminal and the EMI which would be generated. FIG. 7 illustrates a power module 92 comprising a plastic housing 93 with a single large terminal 94 therethrough for power transmission between boards.

The structure of the high speed connector 10 illustrated in FIGS. 1 through 4 is made possible by a manufacturing process utilizing die cast zinc. The first step is die casting the metal housing 11 by conventional zinc die casting apparatus, using core pins moving at right angles to form the passages 15 having right angles in the housing 11. The housing 11 is then cooled and moved to a molding station where core pins move at right angles into passage 15 at first face 12 and second face 13, and nylon is injection molded around the core pins to form sleeve 36. The housing 11 is then transferred to a second zinc die casting station where terminals 30 are cast through the housing 11 in nylon sleeves 36. The connectors are then transferred to plating baths where the exposed zinc surfaces are plated with copper and subsequently gold prior to insertion of inserts 34 to form the finished connector. Several alternatives are possible in the plating process, including a chrome on zinc plate according to the teachings of U.S. Pat. Nos. 4,095,014 and 4,156,634 to Iosso. The chrome is subsequently plated with gold. The auxiliary connector 38 of FIGS. 1 through 4 is similarly manufactured, though the use of right angle core pins is not necessary.

The foregoing description is exemplary and not intended to limit the scope of the claims which follow. For example, high speed right angle connectors with pins at both first and second faces, eliminating the need for auxiliary connectors permanently mounted to the mother board, would be within the scope of the invention.

We claim:

1. Electrical connector of the type comprising an electrically conductive housing having at least one row of passages therein, each passage extending between a first face and a second face of said housing, each connector further comprising a plurality of electrical terminals lying in respective passages, each terminal having a first end at said first face and a second end at said second face, each terminal being surrounded by a dielectric sleeve lying in the respective passage, said sleeves insulating said terminals from said housing, said connector being characterized in that said first face and said second face are substantially planar and lie in substantially perpendicular planes, said passages having substantially right angle bends therein, said sleeves and said terminals likewise having substantially right angle bends therein.

2. An electrical connector as in claim 1 characterized in that said housing is die cast metal.

3. An electrical connector as in claim 1 characterized in that said dielectric sleeve is injection molded plastic.

4. An electrical connector as in claim 1 characterized in that said terminals are die cast metal.

5. An electrical connector as in claim 2 or claim 4 characterized in that said metal is zinc.

6. An electrical connector as in claim 1 characterized in that said first end of said terminal is a pin which extends beyond said first face, said sleeve being flush with said first face.

7. An electrical connector as in claim 6 characterized in that said second end of said terminal is a socket which is flush with said second face of said connector, said sleeve being flush with said second face.

*8. Apparatus for high speed signal transmission and for interconnecting high speed circuits without appreciable degradation of electrical transmission characteristics, the apparatus comprising: conductive housing means having plural apertures, dielectric sleeves within each aperture and a plurality of terminals, each disposed within a dielectric sleeve, the dielectric sleeves each comprising a molded structure and the housing means comprising a cast structure, the dielectric sleeves and the housing means being formed by sequential molding and casting processes, the one of said structures formed in an initial one of said processes forming a part of the mold for the subsequent one of said structures.*

*9. A high density, high speed connector apparatus for interconnecting corresponding circuits on printed circuit boards comprising first and second intermatable connectors, each connector having a plurality of terminals, each intermatable with corresponding terminals in the other connector, each terminal being located within a separate dielectric sleeve, each connector having a unitary electrically conductive outer housing having internal walls separating adjacent terminals, the dielectric sleeves being positioned within cavities extending between opposite sides of the outer housing formed by the internal walls of the unitary housing, the outer housing and the dielectric sleeves being formed by the sequential steps of casting an outer housing of a conductive material and injection molding a plurality of dielectric sleeves located in the housing, the housing or dielectric sleeve formed in the first of said sequential steps forming a portion of the mold defining the subsequently formed housing or dielectric sleeves followed by the step of positioning conductive terminals within the dielectric sleeves.*

*10. A method of manufacturing an electrical connector having a plurality of terminals separated from a conductive outer housing by dielectric sleeves between the housing and the terminals to define the electrical signal transmission characteristics of the connector, comprising the sequential steps of: a step of casting an outer housing of a conductive material and a step of injection molding a plurality of dielectric sleeves in the housing, the housing or dielectric sleeves formed initially, forming a portion of the mold defining the subsequently formed dielectric sleeves or housing respectively; followed by the step of positioning conductive terminals within the dielectric sleeves.*

*11. The method of claim 10 wherein the outer housing is cast of a metallic material and the dielectric sleeves are injection molded within apertures in the outer housing.*

* * * * *